United States Patent [19]
Saniez et al.

[11] Patent Number: 5,962,254
[45] Date of Patent: Oct. 5, 1999

[54] NITROGENOUS COMPOSITION RESULTING FROM THE HYDROLYSIS OF WHEAT GLUTEN AND PROCESS FOR ITS MANUFACTURE

[75] Inventors: Marie-Héléne Saniez, Saint Andre France; Pierre-Antoine Gouy, Perenchies; Thomas Erpicum, Richebourg, all of France

[73] Assignee: Roquette Freres, Lestrem, France

[21] Appl. No.: 09/004,983

[22] Filed: Jan. 9, 1998

[30] Foreign Application Priority Data

Jan. 10, 1997 [FR] France ................... 97 00198

[51] Int. Cl.⁶ ................ A23J 3/18; A23J 3/34; C12P 21/06
[52] U.S. Cl. ................ 435/68.1; 426/46; 426/52; 426/53; 426/54; 426/63; 426/652; 426/653; 426/654; 530/343
[58] Field of Search ............ 435/68.1; 530/343; 426/652, 653, 46, 656, 52, 53, 54, 63

[56] References Cited

U.S. PATENT DOCUMENTS 2,628,931  2/1953  Nunheimer et al. .
5,273,773  12/1993  Katayama et al. .

FOREIGN PATENT DOCUMENTS

| 0 026 125 | 4/1981 | European Pat. Off. . |
| 233 932 | 3/1986 | Germany . |
| 41 16 744 | 11/1992 | Germany . |
| A-5-336954 | 12/1993 | Japan . |
| WO 89/06091 | 7/1989 | WIPO . |
| WO 91/16447 | 10/1991 | WIPO . |

OTHER PUBLICATIONS

J. Dairy Sci. 76:2145–2151, 1993 by E. Tsakalidou et al.

*Primary Examiner*—Herbert J. Lilling
*Attorney, Agent, or Firm*—Henderson & Sturm

[57] ABSTRACT

The invention relates to a nitrogenous composition resulting from the hydrolysis of wheat gluten by steepwater obtained from the maize starch industry, characterized in that it exhibits a ratio of inorganic phosphorus to total phosphorus (Pi/Pt) concentrations greater than or equal to 0.15 and a ratio of amino nitrogen to total nitrogen (Na/Nt) concentrations greater than or equal to 0.11.

23 Claims, 1 Drawing Sheet

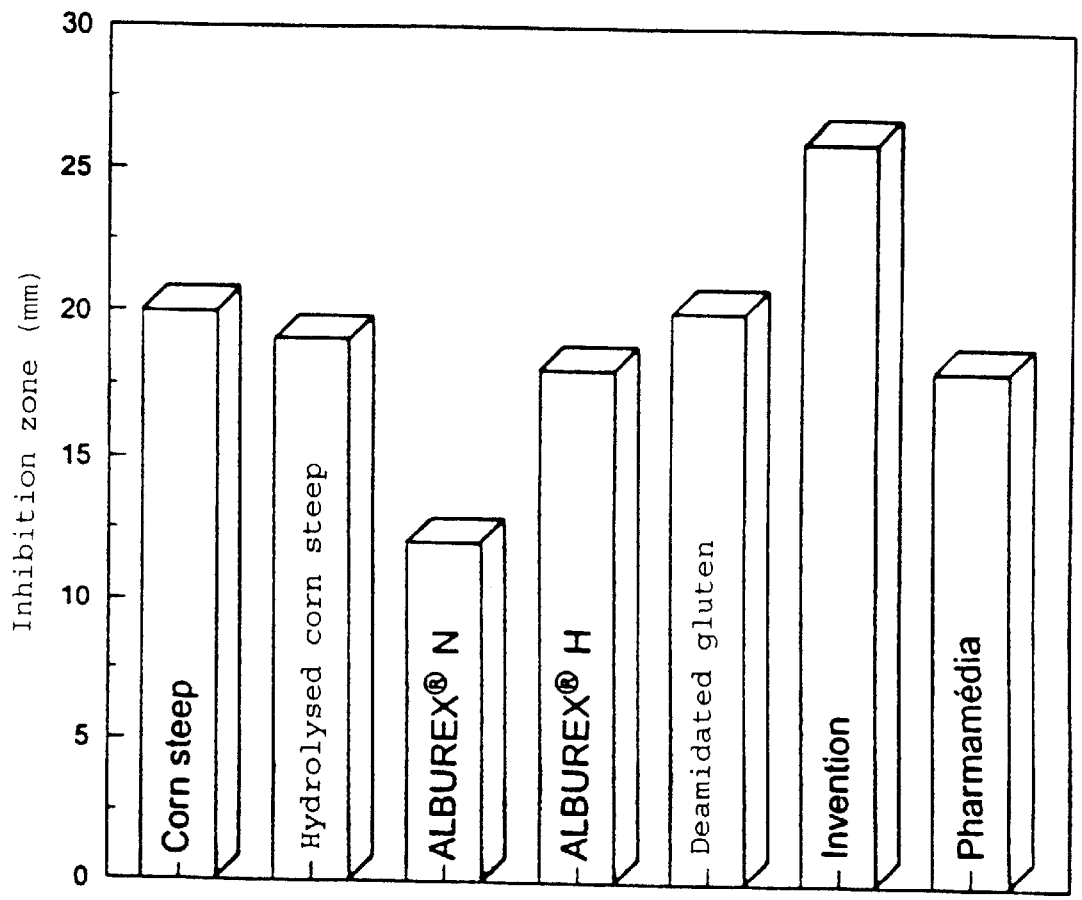

NITROGENOUS COMPOSITION RESULTING FROM THE HYDROLYSIS OF WHEAT GLUTEN AND PROCESS FOR ITS MANUFACTURE

The present invention relates to a nitrogenous composition resulting from the hydrolysis of wheat gluten by steepwater obtained from the maize starch industry.

The present invention also relates to a process for the manufacture of such a nitrogenous composition, as well as to its application as culture medium in the fermentation industries and as food or food additive in compositions intended for humans or animals.

Wheat gluten, on the one hand, and corn steep, on the other, are known to be a source of nitrogen in the fermentation industries.

However, wheat gluten is a poorly balanced source of amino acids. That is why its use in the fermentation industries and as food or food additive requires supplementing it with amino acids by adding substances containing the essential amino acids which make it possible to rebalance its composition. This supply of amino acids may be made in the form of corn steep, of cotton proteins, of yeast extracts or of free amino acids.

Whatever the case, wheat gluten in nonhydrolysed form, enriched with amino acids or otherwise, is a source of nitrogen which is difficult to use, or which is even unusable, in the fermentation industries because of its viscoelastic properties. Its solubilization is therefore essential if it is desired to use it in biotechnology processes or as food or food additive.

This solubilization of gluten may be carried out either by acid hydrolysis, or by alkaline hydrolysis, or by enzymatic hydrolysis. For example, Patent Application U.S. Pat. No. 5,273,773 describes the production of partially hydrolysed products by virtue of specific treatments of proteins. These products are valuable for enhancing the quality of the foods or as dispersing agents.

The use of endogenous enzymes of microorganisms such as yeasts has also already been exploited for hydrolysing proteins such as those of soya bean or of maize (International Patent Application WO-A-91/16447) . The hydrolysis is then carried out by the enzymes responsible for the autolysis of yeast, enzymes which are not commercialized, or by the addition of exogenous enzymes or the mixture of both. The hydrolysed mixture is then used in food.

Corn steep which, it should be recalled, is obtained by evaporating steepwater obtained from the maize starch industry, is known to be a very valuable source of nitrogen in the fermentation industries. It is used in most biological, antibiotic, vitamin, organic acid and enzyme production. It is also used in the production of biomass.

The steeping of maize constitutes the first stage in the extraction of starch in wet milling. It consists in maintaining the maize, placed in silos, for a given time in a hot water containing a low quantity of sulphur dioxide, this being in order to facilitate the subsequent protein-cellulose-starch separation and to prevent, moreover, the growth of undesirable microorganisms.

During this operation, two essential phenomena take place simultaneously. On the one hand, the highly fermentable soluble materials contained in the maize grains are transferred into the steepwater. On the other hand, the steeping conditions (presence of sulphites and of sugars, temperature profile) are favourable to the rapid development of bacteria, mainly lactic acid bacteria.

The steepwater is then concentrated to about 50% dry matter in an evaporator, in order to obtain a thick syrup commonly called "corn steep" by persons skilled in the art.

The principal value of corn steep is linked to its specific composition due to the transfer and conversion, by lactic acid fermentation, of these soluble materials. This composition contains factors which promote the growth of microorganisms and make corn steep an ideal source of nutrient materials, particularly in the fermentation industries.

Indeed, corn steep contains, as easily assimilable carbon sources: sugars and organic acids, as nitrogen sources: amino acids and polypeptides and as sources of trace elements necessary for the growth of microorganisms: "buffering" agents and minerals.

In addition, it constitutes a relatively inexpensive substrate, compared with yeast extracts which represent the reference material in this field and which are also used as human and animal food.

For use in fermentation, corn steep should be subjected beforehand to sterilization, for which the temperature and pH conditions as well as the duration are chosen in order to obtain the destruction of microorganisms. Thus, the sterilizing temperature is generally between 105 and 130° C. and the pH varies between 3.0 and 8.0.

Patent Application JP-A-5,336,954 teaches that the mixture of corn steep with a protein such as egg albumin subjected to enzymatic hydrolysis may be advantageous as source of nitrogen for the growth of the following microorganisms: *Escherichia coli, Bacillus subtilis, Lactobacillus brevis, Serratia marcescens*. This culture medium is also more economical than a medium based on peptone.

Mixtures of nitrogenous substances have also been described in Patent U.S. Pat. No. 2,628,931 where the corn steep is mixed with wheat gluten and then sterilized in an autoclave at a temperature of between 120 and 122° C. before being inoculated with a strain of *Streptomyces griseus*. This source of nitrogen promotes the production of Streptomycin.

International Patent Application WO-A-89/06091 proposes a process for modifying gluten consisting in treating gluten, wet or dry, with an effluent obtained from an operation of the process for extracting starch. This process takes advantage of the presence, in a very small quantity, of lactic acid in such an effluent in order to modify the gluten. This effluent previously undergoes a heat treatment or otherwise, in order to destroy the microorganisms and to inactivate the enzymes which are present therein. The gluten treatment time is between 10 min and 2 h, which duration does not allow enzymatic hydrolysis of the gluten. Because of this, the gluten thus modified has enhanced emulsifying and foaming properties, which properties are not at all sought in the fermentation and animal feed industries.

The process for steeping maize described in Patent EP-B-026,125 shows that the lactic acid fermentation characteristic of this process is completely controlled and that the bacteria for the steeping exhibit, by virtue of this process, a maximum biological activity.

Moreover, E. Tsakalidou et al. (J. Dairy Sci., 76: 2145–2151, 1993) and G. Pritchard et al. (FEMS Microbiology Reviews 12 (1993) 179–206) have shown that the lactic acid bacteria possess complex proteolytic systems located in the cell wall, the cytoplasmic membrane or inside the cell, and that the enzymes forming part of these proteolytic systems work at 48° C., at pH values of between 4 and 6.

This powerful proteolytic activity of the lactic acid bacteria contained in the steepwater, optionally reinforced by a commercial protease, will allow the proteolysis of wheat gluten. This proteolysis is facilitated by the solubilizing action of the lactic acid (contained in the steepwater) on the wheat gluten.

BRIEF DESCRIPTION OF THE DRAWING

FIG. 1 is a chart of the results of Example 8 for the source tested with the diameter of the inhibition zone expressed in mm.

The invention therefore relates, firstly, to a nitrogenous composition resulting from the hydrolysis of wheat gluten, characterized in that it exhibits a ratio of inorganic phosphorus to total phosphorus (Pi/Pt) concentrations greater than or equal to 0.15 and a ratio of amino nitrogen to total nitrogen (Na/Nt) concentrations greater than or equal to 0.11.

The inorganic phosphorus and total phosphorus concentrations are measured according to known methods such as those described below.

As regards the inorganic phosphorus, the reference method consists in extracting mineral or inorganic phosphorus with a solution of trichloroacetic acid, in forming a phosphomolybdic complex by reaction between the inorganic phosphorus and ammonium molybdate and in measuring the absorbance of this complex in a spectrophotometer at a wavelength of 805 nm.

As regards the total phosphorus, its assay is carried out according to the standard method ISO 3946, which is based on the same principle as that applied to the determination of the inorganic phosphorus concentration, described above. A preliminary stage is however used, a stage consisting in destroying the organic materials in the products to be assayed so as to convert all the organic phosphorus to inorganic phosphorus (the total phosphorus is therefore the organic phosphorus plus the inorganic phosphorus), by mineralization with the aid of a sulphonitric mixture and conversion of the phosphates to orthophosphates. The next stages consist in forming the molybdic complex and then in measuring the absorbance at a wavelength of 825 nm.

Preferably, the inorganic phosphorus concentration to total phosphorus concentration (Pi/Pt) ratio is between 0.20 and 0.35, and still more preferably between 0.25 and 0.35.

The amino nitrogen and total nitrogen concentrations are measured according to known methods such as those described below.

As regards the amino nitrogen, its assay is carried out by causing the amine functional group of the product to be assayed to react with an excess of formaldehyde, in order to give an acid which can be titrated with a solution of sodium hydroxide. The free amino nitrogen is equivalent (mole for mole) to the sodium hydroxide used for the titration.

As regards the total nitrogen, its assay is carried out according to the standard method ISO 3188 which consists in mineralization of the product to be assayed with sulphuric acid in the presence of a catalyst, and then in alkalinization of the products of the reaction and in distillation of the liberated ammonia collected in a solution of boric acid which is titrated with a solution of sulphuric acid.

The total protein and soluble protein levels of the composition in accordance with the present invention are between 50 and 85% on a dry basis and 40 and 65% on a dry basis, respectively.

Total protein level is understood to mean the total nitrogen multiplied by a factor 6.25.

Soluble protein level is understood to mean the total nitrogen multiplied by a factor 6.25 contained in the soluble fraction which corresponds to the supernatant obtained after dispersion of the sample in distilled water and centrifugation.

In addition, the nitrogenous composition in accordance with the invention is characterized in particular by a free leucine content greater than or equal to 1300 mg/100 g on a dry basis and a free alanine content greater than or equal to 1100 mg/100 g on a dry basis.

Finally, the nitrogenous composition which is the subject of the present invention comprises numerous mineral macro- and microelements. It is characterized by an ash content of between 3 and 12% on a dry basis, and preferably of between 4 and 6% on a dry basis. Such a content of natural mineral macro- and microelements, combined with the other characteristics of the composition according to the invention which are described above, confers on it properties which are advantageous for its use as animal feed (high richness in nitrogen, ash content <6%).

The invention relates, secondly, to a process for the manufacture of a nitrogenous composition resulting from the hydrolysis of wheat gluten by maize steepwater and which possesses the characteristics mentioned above.

This process consists essentially in mixing wheat gluten with steepwater obtained from the maize starch industry.

The wheat gluten used is preferably a green gluten obtained from the process for the extraction of gluten by lixiviation of wheat flour. Indeed, before drying, the so-called "green" gluten also contains a natural lactic acid flora which is a source of an advantageous proteolytic enzyme. It is also a source of natural plant phytase which can be advantageously used to hydrolyse the phytates contained in the steepwater.

The process of the invention takes advantage of the lactic acid flora of green gluten, of the proteolytic effect of the enzymes of the lactic acid bacteria present in the steepwater, and of the solubilizing action of the lactic acid also present in the steepwater.

The process for the manufacture of the nitrogenous composition in accordance with the invention thus allows the production of a range of compositions which can be defined as cohydrolysates of steepwater and of wheat gluten. The hydrolysis of wheat gluten is carried out by virtue of the proteolytic and peptidase enzymes of the lactic ferments. This hydrolysis can be further enhanced by the addition of a commercial exogenous protease which will act in synergy with the natural enzymes of lactic ferments. The phytates of the steepwater are hydrolysed by virtue of the natural wheat phytase, the latter not being denatured by the gluten extraction process used.

Thus, surprisingly and unexpectedly, the Applicant has demonstrated that if the hydrolysis of the wheat gluten containing a natural phytase is carried out in the presence of steepwater obtained from the maize starch industry and containing active lactic ferments, a specific hydrolysis of wheat gluten as well as a specific hydrolysis of steepwater occur. This double hydrolysis confers on the final nitrogenous composition quite specific properties such as the inducing of the growth of various microorganisms, the inducing of the production of certain metabolites, and in a manner which is much more advantageous than the dry gluten/corn steep mixture.

The process according to the invention comprises the successive steps consisting in mixing steepwater obtained from the maize starch industry with wheat gluten, in allowing the enzymes and the lactic acid, which are naturally present in the gluten, and the steepwater to act, with stirring, for a period which depends on the quantities used, in activating the enzymes, and then in concentrating the resulting composition by evaporation.

The materials used in the process of the invention are therefore steepwater obtained from the maize starch industry and wheat gluten. The steepwater is obtained preferably from the last steeping silo of the process described in Patent FR-B-026,125. It has a dry matter of between about 7 and 13 Brix, and preferably equal to 10 Brix. It is recalled that Brix is a unit of measurement commonly used in the starch industry, and that the Brix of a steepwater is determined very easily by reading in a refractometer. A Brix of about 10 corresponds, for the product which is the subject of the invention, to a dry matter of about 10%.

The steepwater used in the process in accordance with the invention has undergone no heat treatment (evaporation), and no mechanical or chemical treatment capable of destroying the proteolytic enzymes which are present naturally therein. It is not therefore corn steep, which is obtained by evaporation of steepwater.

As already mentioned, the wheat gluten used in the process is preferably green wheat gluten, although it is also possible to use dry wheat gluten.

Depending on the applications sought for the nitrogenous composition of the invention, it is possible to prepare mixtures in steepwater/wheat gluten proportions of between 1/1 and 1/3, these ratios being expressed on a dry basis.

According to a preferred embodiment of the invention, an exogenous enzyme, chosen from the group consisting of proteases and phytases alone or in a mixture with each other, is added to the mixture consisting of steepwater and gluten.

The quantities of exogenous enzyme used depend on the activity specific to the enzyme chosen and on the conditions for its use (concentration of the substrate, pH, temperature, duration of the treatment). These quantities are between 0.25% and 1% relative to the dry matter of the substrate, which corresponds approximately to a range of 0.05 AU (Anson Unit) to 2 AU per 100 g of dry matter of the substrate.

The proteases which can be used in the process according to the invention are chosen in particular from the group consisting of acid proteases, such as those manufactured by the company BIOCON (ACID PROTEASE LB 59), by the company GIST BROCADES (PROTEASE A), by the company ROHM (COROLASE PS), by the company GENENCOR (PROTEASE B99), or alternatively by the company NOVO (FLAVOURZYME, NEUTRASE).

The commercial proteases are provided in the form of crude enzymatic preparations extracted from microorganisms and possess, as a result, secondary enzymatic activities such as phosphatase, cellulase and lipase activities. These secondary enzymes, and in particular the phosphatases, advantageously participate in the treatment of maize steepwater.

The exogenous phytase which can be used in the process according to the invention is for example that manufactured by the company BASF (NATUPHOS).

The mixture of gluten, steepwater and optionally exogenous protease is kept between 4 and 8 hours at a temperature of about 48° C. The natural pH of the mixture, which is between 5 and 5.5, is preserved. The treatment is preferably carried out with constant stirring.

When the Pi/Pt and Na/Nt ratios reach the desired values, the enzymatic reactions can be stopped by inactivation of the enzymes. For that, physical means (temperature) and/or chemical means (pH) are used. Preferably, the reaction medium is subjected to heating at 60–90° C. for a period of between 10 and 30 minutes.

The nitrogenous composition can then be concentrated to 50% dry matter by evaporation, either to be stored in liquid form, or to be spray-dried or dehydrated in another appropriate manner.

The composition according to the invention, by virtue of its specific characteristics, is certainly of interest when it is used as microbial growth substrate in the fermentation industries. Thus, when the composition in accordance with the invention is manufactured from a steepwater/gluten mixture in a 1/1 ratio (expressed on a dry basis), it constitutes a substrate which is satisfactory for the production, under good conditions, of yeasts, lactic acid bacteria or other microorganisms.

It is also particularly suitable for the production of metabolites obtained by genetically modified microorganisms.

In addition, it is of interest to the food industry because of its nutritional properties and its flavour properties, and can thus be used as food or as taste enhancer in compositions intended as human or animal food. In this case, the composition in accordance with the invention is manufactured from a steepwater/gluten mixture in a 1/3 ratio (expressed on a dry basis).

Other characteristics and advantages of the present invention will appear clearly on reading the examples given below which illustrate the invention without, however, limiting it.

EXAMPLE 1

In a 2-1 reactor, 1 l of steepwater at 10% dry matter, obtained from the last steeping silo of the process described in Patent FR-B-026,125, is mixed with 1 kg of green gluten. 0.5 g of enzyme of the BIOCON LB59 acid protease type is also added to the mixture. The natural pH of 4.5 of the mixture being preserved, there is no regulation of pH. The mixture is kept for 4 hours at 48° C. It is then observed that the lactic acid present in the steepwater allows immediate solubilization of the gluten, which facilitates its hydrolysis.

After reacting for 4 hours, the mixture is heated to a temperature of 70° C. in order to neutralize the enzymes and to destroy the lactic acid bacteria. The mixture is then concentrated to 50% dry matter and/or can also be spray-dried.

Depending on the steepwater/wheat gluten ratio which it is finally desired to obtain, the quantities of raw materials used may vary in the following manner:

| Composition | Ratio | Steepwater (in liters) at 10% DM | Green gluten (in kg) at 30% DM |
| --- | --- | --- | --- |
| A | 1/1 | 1 | 0.3 |
| B | 1/1.8 | 1 | 0.6 |
| C | 1/3 | 1 | 1.0 |

By way of comparison and in order to demonstrate the value of the process in accordance with the invention, a gluten, previously hydrolysed with the aid of the same exogenous protease, was mixed with a quantity of corn steep, so as to obtain a 1/3 corn steep/gluten ratio as dry matter (DM) (composition D). Previously hydrolysed gluten is understood to mean a gluten having a minimum solubility of 50%.

| Composition | Ratio | Steepwater (in liters) at 50% DM | Dry gluten (in kg) |
| --- | --- | --- | --- |
| D | 1/3 | 0.2 | 0.3 |

Mixture C according to the invention exhibits the composition indicated below. The composition of mixture D is also indicated in order to demonstrate the value of the use of the proteolytic activity of the steepwater.

|  | Mixture D | Mixture C |
| --- | --- | --- |
| Protein materials | 65–78% | 65–72% |
| Reducing sugars | 0.5% | 0.1% |
| Iron | <100 ppm | <100 ppm |
| Amino nitrogen as N % | 0.8 to 1% | 1.3 to 2% |
| Na/Nt | 0.7 to 0.10 | 0.11 to 0.20 |
| Ash | 5 to 6% | 5 to 6% |
| Pi/Pt | <0.25 | >0.25 |
| Nt | 10 to 12% | 10 to 12% |

Composition C according to the invention is therefore characterized by:

a nitrogen content greater than 10%, an ash content less than 6%, an amino nitrogen/total nitrogen ratio >0.11, an iron content less than 100 ppm, a reducing sugar content less than 0.1%, a total phosphorus content greater than 1%, an alanine content >1100 mg/100 g on a dry basis, a leucine content >1300 mg/100 g on a dry basis.

The analyses of free amino acids of compositions C and D are given in the following table:

| mg/100 g on a dry basis | Mixture D | Mixture C |
| --- | --- | --- |
| Aspartic a. | 20 | <10 |
| Threonine | 145 | 240 |
| Serine | 165 | 375 |
| Glutamic a. | 60 | 165 |
| Proline | 470 | 645 |
| Glycine | 100 | 180 |
| Alanine | 785 | 1160 |
| Valine | 270 | 425 |
| Cysteine | <10 | <10 |
| Methionine | 170 | 300 |
| Isoleucine | 170 | 290 |
| Leucine | 650 | 1335 |
| Tyrosine | 25 | 85 |
| Phenylalanine | 275 | 545 |
| Histidine | 50 | 15 |
| Ornithine | <10 | 75 |
| Lysine | 35 | 75 |
| Arginine | 50 | 60 |

As for the physical properties, mixture C exhibits a solubility of greater than 70%.

Solubility is understood to mean the dry matter of the supernatant obtained after centrifugation of a sample diluted in water expressed as a percentage of the total dry matter used.

EXAMPLE 2

In order to be able to demonstrate the specific action of steepwater on wheat gluten, four trials were carried out in accordance with the process of the invention:

Trial 1: Gluten (100 g on a dry basis/l)+steepwater (1 liter at 10 Brix),

Trial 2: Gluten (100 g on a dry basis/l)+steepwater (1 liter at 10 Brix)+protease 0.5%/W. dry prod., Trial 3: Gluten (100 g on a dry basis/l)+corn steep (0.5 liter at 20 Brix), Trial 4: Gluten (100 g on a dry basis/l)+corn steep (0.5 liter at 20 Brix)+protease 0.5%/W. dry prod.

The operation is carried out at an equal percentage of dry matter. The 20 Brix corn steep is diluted in order to obtain a dry matter of 10%.

The replacement of the steepwater with 20 Brix liquid corn steep makes it possible to verify the efficiency of the proteolytic enzymes of the steepwater on the gluten proteins. In corn steep, these enzymes are indeed destroyed at the level of the heat treatment of the evaporation.

The results (expressed in %/dry basis) are assembled in the table which follows.

| Trial | 1 | 2 | 3 | 4 |
| --- | --- | --- | --- | --- |
| Dry matter | 53 | 53 | 53 | 48 |
| Total N. 6.25 | 64 | 64 | 65 | 65 |
| Soluble N. 6.25 | 31 | 50 | 25 | 50 |
| Soluble/total N. 6.25/N. 6.25 | 0.5 | 0.8 | 0.4 | 0.8 |
| Amino N. | 1.74 | 2.13 | 1.55 | 1.90 |
| Na/Nt | 0.17 | 0.21 | 0.15 | 0.18 |
| Ash | 11 | 12.5 | 11 | 11 |
| Total free amino a. | 8.1 | 11.5 | 7.2 | 10.3 |
| Nt | 10.24 | 10.24 | 10.4 | 10.4 |
| Pi/Pt | 0.2 | 0.22 | 0.2 | 0.22 |

The solubility (in % on a dry basis) of the compositions of trials 1 to 4 as a function of the pH was also measured. The results obtained are assembled below.

| Trial | 1 | 2 | 3 | 4 |
| --- | --- | --- | --- | --- |
| pH 3.0 | 50 | 85 | 40 | 85 |
| pH 4.0 | 50 | 82 | 40 | 75 |
| pH 5.0 | 58 | 82 | 47 | 80 |
| pH 6.0 | 54 | 79 | 44 | 80 |
| pH 7.0 | 54 | 77 | 44 | 80 |
| pH 8.0 | 54 | 74 | 45 | 81 |

The analytical results of these four trials demonstrate the substantial action of the proteolytic enzymes present in the steepwater. If trial 1 is compared with trial 3, it is observed that the soluble N. 6.25/total N. 625 ratio, as well as the aqueous solubility, increase by 10% in the case where the steepwater is used. There is therefore an action of the proteolytic enzymes contained in the steepwater.

This difference disappears when 0.5%/dry basis of enzyme (protease) is added to the mixture. It is the comparison of trials 2 and 4 which shows this.

In this case, the absence of proteolytic enzymes from corn steep is a limiting factor for the solubilization of gluten. A decrease in the quantity of enzyme added would cause a reduction in the solubility of the gluten. On the other hand, by using steepwater, it is possible to decrease the quantity of enzyme or to increase the concentration of gluten in the mixture while maintaining a maximum gluten solubility.

EXAMPLE 3

Productions of cephalosporin were evaluated as a function of nitrogenous compositions C and D of Example 1.

The production of cephalosporin was carried out under the following conditions. The microorganism used was

*Cephalosporium acremonium* ATCC 11550 regenerated on CGA agar whose composition is the following (autolytic yeast extract 5 g/l, glucose 20 g/l, chloramphenicol 0.1 g/l, agar 15 g/l).

The production Erlenmeyer flasks are inoculated with the aid of Cephalosporium obtained from a 120-h preculture medium. This preculture medium consists of 100 ml of CGA broth which is introduced into a 500-ml Erlenmeyer flask with 2 baffles, which Erlenmeyer flask was inoculated with a square of CGA agar on which the Cephalosporium has grown for 7 days.

The production Erlenmeyer flasks containing 75 ml of production medium are inoculated with 2 ml of pre-culture and are stirred at 120 rpm for 120 h at 30° C. The production media contain:

50 g/l of glucose 2.5 g/l of $KH_2PO_4$ 5 g/l of $CaCO_3$ 6 g/l of soya bean oil 3.3 g of nitrogen equivalent of the product tested.

The products tested are composition C, composition D and a solution of cotton protein marketed by TRADERS PROTEIN under the name PHARMAMEDIA®, corresponding to a nitrogen equivalent of 2.6 g/l.

After 120 h, and in order to evaluate the production of cephalosporin, 5 ml of each production Erlenmeyer flask are collected and centrifuged for 15 min. 65 µl of supernatant of a dilution of antibiotic are placed on cellulose discs which are themselves placed at the surface of a Petri dish on which the cephalosporin-sensitive test strain has been spread, namely *Staphylococcus aureus* ATCC 6538.

After 24 h at 30° C., the Staphylococcus growth inhibition diameter is measured. From the results of the cephalosporin C range, it is possible to plot the graph of the zone of inhibition as a function of the cephalosporin C concentration. Thus, the various samples tested gave the following results:

| | |
|---|---|
| Composition D | 7.85 mg/10 ml |
| Composition C | 11.6 mg/10 ml |
| Pharmamédia ® | 5.6 mg/10 ml |

Composition C according to the invention is the best among those tested.

EXAMPLE 4

The influence of compositions C and D obtained in Example 1 was tested on the production of penicillin according to the protocol described below. A suspension of spores of a strain $P_2$ (obtained from the PANLABS laboratory) is used as inoculum.

The preculture flasks, with a useful volume of 500 ml and containing the following medium adjusted to pH 5: 3% of glucose, 1% of lactose, 0.25% of nitrogen equivalent of the product to be tested, 0.2% of $(NH_4)_2SO_4$, 0.5% of $CaCO_3$, 0.05% of $KH_2PO_4$, 1% of Pharmamedia® and 1% of yeast extract, are cultured on a shaking table at 220 rpm for 45 h at 25° C.

2 ml of this medium are introduced into the production medium, distributed in an amount of 35 ml into 500 ml flasks with two baffles. The composition of the medium is the following: 12% of lactose, 1% of $(NH_4)_2SO_4$, 1% $CaCO_3$, 0.05% of $KH_2PO_4$, 0.5% of $K_2SO_4$, 0.23% nitrogen equivalent of the product to be tested, 1% of soya bean oil, pH 6.6 at 25° C. for 6 days and with stirring at 220 rpm.

After 6 days, the medium is centrifuged for the time necessary to obtain a clear supernatant which contains the penicillin produced.

Blotting disks are impregnated with 65 µl of the supernatants and deposited in Petri dishes containing a soya bean trypticase agar medium previously inoculated with the penicillin-sensitive *Sarcina lutea* strain ATCC 9341.

The diameter of the growth inhibition zones which are observed is then measured in both cases after incubating for 24 h at 30° C. From the results of the calibration series giving the penicillin concentration as a function of the inhibition diameter, the results obtained were the following:

| | |
|---|---|
| Composition D | 7.20 g/l |
| Composition C | 10.65 g/l |
| Pharmamédia ® | 6.80 g/l |

Composition C according to the invention is the best among those tested.

EXAMPLE 5

The influence of compositions C and D obtained in Example 1 was tested on the production of tetracycline.

The strain used is *Streptomyces aureofaciens* DSM 40127.

From Petri dishes containing the following medium: 20 g/l starch, 5 g/l of bio-soyase, 5 g/l of yeast extracts, 10 g/l of glucose, 17 g/l agar, 1 g/l calcium carbonate, on which the production strain has sporulated, the cells are recovered by scraping the surface of the medium over 1 cm².

It is then possible to inoculate the following production medium: 35 g/l of maltodextrin, 4 g/l of soya bean oil, 5 g/l of $CaCO_3$, 1 g/l of $MgSO_4$ and 1 g/l of $KH_2PO_4$ and 0.83 g/l of nitrogen equivalent of the composition to be tested.

After 120 h of culture at 30° C., with stirring at 220 rpm, of 500-ml Erlenmeyer flasks containing 500 ml of medium, the medium is centrifuged so as to obtain a clear supernatant. This supernatant is placed on a cellulose disc, itself placed at the surface of a Petri dish containing the medium on which an inoculum of *Sarcina lutea,* a tetracycline-sensitive strain, has been spread.

The diameter of the observed growth inhibition zones is then measured after incubation for 24 h at 30° C. From the results of the calibration series giving the tetracycline concentration as a function of the inhibition diameter, the results of the following table show the value of composition C according to the invention in this application.

| | |
|---|---|
| Composition D | 3.1 mg/10 ml |
| Composition C | 3.5 mg/10 ml |
| Pharmamédia ® | 2.2 mg/10 ml |

EXAMPLE 6

The three studies described above consist in monitoring the increase in the number of cells as a function of time in a culture medium containing the nitrogenous compositions C and D of Example 1 and yeast extracts.

The first study relates to the yeast *Saccharomyces cerevisiae.*

Culture media are prepared by adding, to demineralized water, glucose in an amount of 10 g/l and 0.1 g/l of nitrogen equivalent of the various nutrient compositions.

100 ml of each of these media are then inoculated with 0.1% by volume of a preculture of the strain. The incubation is carried out at 30° C., with stirring at 280 rpm for 24 h. The enumerations are carried out at times 0, 8 and 24 h on OGA (Oxytetracycline - Glucose - Agar) medium. The results obtained are assembled in the table below.

| CFU/ml | 0 h | 8 h | 24 h |
| --- | --- | --- | --- |
| Composition D | $4.2 \times 10^3$ | $1.9 \times 10^6$ | $4.1 \times 10^8$ |
| Composition C | $1.7 \times 10^3$ | $5.8 \times 10^6$ | $8.9 \times 10^8$ |
| Yeast extract | $3.1 \times 10^3$ | $1.1 \times 10^6$ | $3.9 \times 10^8$ |

The population obtained is twice as high with composition C according to the process as that obtained with the yeast extract or composition D.

The second study was carried out with the *Bacillus subtilis* strain under conditions identical to those which have just been described. The culture media are prepared by adding glucose (10 g/l), salts ($MgSO_4$, $KH_2PO_4$, both at 0.05 g/l) and nutrient compositions C and D as well as yeast extracts as nitrogen equivalent 0.1 g/l. The inoculation and incubation conditions are identical to those described above. The enumerations are carried out at times 0, 8 and 24 h on soya bean trypticase agar medium. The results given below confirm the preceding conclusions, namely the value of the nitrogenous compositions according to the invention as fermentation substrate.

| CFU/ml | 0 h | 8 h | 24 h |
| --- | --- | --- | --- |
| Composition D | $3.3 \times 10^2$ | $2.3 \times 10^5$ | $1.8 \times 10^7$ |
| Composition C | $3.3 \times 10^2$ | $5.9 \times 10^5$ | $4.9 \times 10^7$ |
| Yeast extract | $2.9 \times 10^2$ | $3.1 \times 10^5$ | $3.2 \times 10^7$ |

The third study was carried out with the *Lactobacillus plantarum* strain.

Culture media are prepared by adding, to demineralized water, glucose in an amount of 10 g/l and the nitrogenous composition C and D of Example 1 as well as yeast extracts of nitrogen equivalent 0.1 g/l. The incubation is carried out at 45° C. with gentle stirring for 24 h. The enumerations are carried out at times 0, 8 and 24 h on MRS (MAN, ROGOSA, SHARP) medium.

| CFU/ml | 0 h | 8 h | 24 h |
| --- | --- | --- | --- |
| Composition D | $3.3 \times 10^2$ | $2.3 \times 10^5$ | $1.8 \times 10^7$ |
| Composition C | $3.3 \times 10^2$ | $5.9 \times 10^5$ | $4.9 \times 10^7$ |
| Yeast extract | $2.9 \times 10^2$ | $3.1 \times 10^5$ | $3.2 \times 10^7$ |

The results obtained show the value of composition C according to the invention.

EXAMPLE 7

The mixture of Example 1 can also be used as animal feed. Indeed, given its composition, it can be used as milk replacer in calf feed. The iron levels for the 1/3 ratio (on a dry basis) are, for three different trials, less than 50 ppm.

When compositions C and D are compared, the nutritional value of composition C can be seen. In this composition C in accordance with the invention, the availability of phosphorus and amino acids is greater.

EXAMPLE 8

Penicillin production trials are carried out with various protein hydrolysates as nitrogen source in culture media. The aim of this example is to compare the penicillin production obtained with the $P_2$ strain (*Penicillium chrysogenum*) in a medium based on the composition according to the invention, to that obtained by this same strain but in modified media where the composition according to the invention is replaced with other wheat, potato and maize hydrolysates. The operation is carried out at a constant concentration of total nitrogen. The nitrogen sources tested were the following:

corn steep,
hydrolysed corn steep,
Alburex® N,
Alburex® N hydrolysate (hydrolysed Alburex®),
deamidated gluten (soluble),
composition according to the invention,
Pharmamédia®.

The results, expressed in mm (diameter of the inhibition zone), are assembled in the table below:

| | |
| --- | --- |
| corn steep | 20 |
| hydrolysed corn steep | 19 |
| Alburex ® N | 12 |
| hydrolysed Alburex ® N (Alburex ® H) | 18 |
| deamidated gluten | 20 |
| composition according to the invention | 26 |
| Pharmamédia ® | 18 |

These results are represented in FIG. 1.

Of the seven raw materials tested, it is with the nitrogenous composition according to the invention that the largest inhibition zone is obtained.

We claim:

1. A nitrogenous composition resulting from hydrolysis of wheat gluten by steepwater obtained from maize starch industry, said nitrogenous composition comprising a ratio of inorganic phosphorus to total phosphorus concentrations at least equal to 0.15 and a ratio of amino nitrogen to total nitrogen concentrations at least equal to 0.11.

2. A nitrogenous composition according to claim 1, comprising a total protein level of between about 50% and about 85% on a dry basis, and a soluble protein level of between about 40% and about 65% on a dry basis.

3. A nitrogenous composition according to claim 1 comprising a free alanine content at least equal to about 1100 mg/100 g on a dry basis and a free leucine content at least equal to about 1300 mg/100 g on a dry basis.

4. A nitrogenous composition according to claim 1 comprising an ash content of between about 3% and about 12% on a dry basis.

5. A process for producing a nitrogenous composition of claim 1, said process comprising mixing wheat gluten with steepwater obtained from maize starch industry to form a mixture comprising wheat gluten and steepwater.

6. A process according to claim 5, wherein said mixture comprises enzymes and lactic acid present in the wheat gluten and the steepwater said process comprising stirring said mixture and allowing the enzyme and the lactic acid to act and form a resultant composition, inactivating the enzymes, concentrating the resultant composition by evaporation.

7. A process according to claim 5, wherein the steepwater is mixed with the wheat gluten in a steepwater/wheat gluten proportion of between about 1/1 and about 1/3, on a dry basis.

8. A process according to claim 5, comprising adding an exogenous enzyme, selected from the group consisting of proteases, phytases and mixtures thereof, to the mixture.

9. A process according to claim 5, wherein the wheat gluten comprises green gluten.

10. A process according to claim 5, wherein the resultant composition is concentrated to a dry matter content at least equal to about 50%.

11. A process according to claim 5, wherein evaporation of the resultant composition comprises spray-drying.

12. A method of using a nitrogenous composition according to claim 1 as microorganism culture medium.

13. A method of using a nitrogenous composition according to claim 1 as a member selected from the group consisting of food and food additives in compositions intended for humans.

14. A method of using a nitrogenous composition according to claim 1 as a member selected from the group consisting of food and food additives in compositions intended for animals.

15. A nitrogenous composition according to claim 2 exhibiting a free alanine content at least equal to about 1100 mg/100 g on a dry basis and a free leucine content at least equal to about 1300 mg/100 g on a dry basis.

16. A nitrogenous composition according to claim 2 exhibiting an ash content of between about 3% and about 12% on a dry basis.

17. A nitrogenous composition according to claim 3 exhibiting an ash content of between 3% and about 12% on a dry basis.

18. A process according to claim 6, wherein the steepwater is mixed with the wheat gluten in a steepwater/wheat gluten proportion of between about 1/1 and about 1/3, on a dry basis.

19. A process according to claim 6, comprising adding an exogenous enzyme, selected from the group consisting of proteases, phytases, and mixtures thereof to the mixture.

20. A process according to claim 7, comprising adding an exogenous enzyme, selected from the group consisting of proteases, phytases, and mixtures thereof to the mixture.

21. A nitrogenous composition according to claim 4 exhibiting an ash content of between about 4% and about 6% on a dry basis.

22. A nitrogenous composition according to claim 16 exhibiting an ash content of between about 4% and about 6% on a dry basis.

23. A nitrogenous composition according to claim 17 exhibiting an ash content of between about 4% and about 6% on a dry basis.

* * * * *